(12) United States Patent
Sasaki et al.

(10) Patent No.: US 8,384,913 B2
(45) Date of Patent: Feb. 26, 2013

(54) MEASURING METHOD AND MEASURING DEVICE

(75) Inventors: You Sasaki, Tokyo-to (JP); Kazuhiro Ogawa, Tokyo-to (JP); Takaaki Yamazaki, Tokyo-to (JP); Shigeyuki Yamaguchi, Tokyo-to (JP); Ryousuke Miyoshi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 287 days.

(21) Appl. No.: 12/891,900

(22) Filed: Sep. 28, 2010

(65) Prior Publication Data

US 2011/0080596 A1    Apr. 7, 2011

(30) Foreign Application Priority Data

Oct. 1, 2009   (JP) ................... 2009-229188

(51) Int. Cl.
*G01B 11/14* (2006.01)
(52) U.S. Cl. ...................... 356/614; 356/153; 356/141.1
(58) Field of Classification Search .......... 356/601–623, 356/155, 153, 141.1
See application file for complete search history.

(56) References Cited

U.S. PATENT DOCUMENTS

| | | | | |
|---|---|---|---|---|
| 4,015,338 A | * | 4/1977 | Kunze et al. ................... | 33/228 |
| 5,125,164 A | * | 6/1992 | Fournier et al. ................. | 33/608 |
| 7,570,352 B2 | * | 8/2009 | Flannigan et al. ............. | 356/155 |
| 2005/0154548 A1 | * | 7/2005 | Basel et al. ..................... | 702/94 |
| 2008/0034601 A1 | * | 2/2008 | Pettersson ....................... | 33/559 |
| 2008/0059109 A1 | * | 3/2008 | Rankin et al. ................. | 702/127 |
| 2010/0097460 A1 | * | 4/2010 | Abernathy .................... | 348/140 |

FOREIGN PATENT DOCUMENTS

JP    2006-138834 A    6/2006

* cited by examiner

*Primary Examiner* — Hoa Pham
(74) *Attorney, Agent, or Firm* — Nields, Lemack & Frame, LLC (57) ABSTRACT

The invention provides a measuring method for installing a measuring rod 6 in a predetermined relation with respect to a coordinate system set to a mobile object 1, for transcribing a predetermined position of the measuring rod on a ground surface where the mobile object is set, for transcribing a measuring point of an object to be measured as set on the mobile object to the ground surface, for measuring a distance on the ground surface between the transcribed predetermined position and the transcribed measuring point, for obtaining a relation between the measuring point and the measuring rod on the ground based on a result of distance measurement, and for obtaining a position on a horizontal coordinate plane in the coordinate system of the measuring point based on the obtained relation and on the relation with the measuring rod with respect to the coordinate system, and the invention also provides a method for measuring a vertical distance between the predetermined position and the ground surface and a vertical distance between the measuring point and the ground surface, and for measuring three-dimensional position of the measuring point in the coordinate system.

11 Claims, 9 Drawing Sheets

$$\begin{bmatrix} D \\ \Phi \end{bmatrix} = \begin{bmatrix} r/2 & r/2 \\ r/2L & -r/2L \end{bmatrix} \begin{bmatrix} \theta_R \\ \theta_L \end{bmatrix} \quad \cdots \text{EQUATION 1}$$

MEASURING METHOD AND MEASURING DEVICE

BACKGROUND OF THE INVENTION

The present invention relates to a measuring method for a measuring positional relation between a measuring device and various types of sensors in a system, which is used to acquire 3D (three-dimensional) space information of a mobile object such as a vehicle, based on detection data from the various types of sensors. The invention also relates to a measuring device for carrying out the measuring method.

In an on-board type 3D (three-dimensional) space information acquiring system to be installed on board of a mobile object such as a vehicle, information such as position, speed and attitude of the vehicle from a position measuring device and from the various types of sensors are combined, and these information need to be outputted as the 3D space information at a present position of the vehicle.

As a system for acquiring the positional information, a GPS (Global Positioning System) is known, and as a device for detecting position, speed and attitude of a mobile object, an IMU (Inertial Measurement Unit) and the like are known. By the GPS, coordinate position on a ground surface can be measured based on a signal from an artificial satellite. By the IMU, the present position, the attitude, etc. of a vehicle can be determined based on a moving direction, a speed and an attitude of the vehicle.

The GPS can acquire accurate positional information. However, it is not possible to acquire the positional information by the GPS at a place where a radio wave does not reach, for example, at a place where the radio wave is interrupted by construction such as building or at a place such as a valley, a tunnel, etc. where the radio wave does not reach.

On the other hand, the IMU can output detection signals on moving direction, moving speed, acceleration and attitude of a moving object at high density. Base on these detection signals, relative amount of changes within short time can be outputted with very high accuracy. Therefore, when the IMU is used, the information on the present position of the object can be acquired by calculating a relative position from the position acquired by the GPS even when a receiving the radio wave by the GPS is interrupted. However, errors of the positional information acquired are accumulated by drifting of sensor as time elapses.

Therefore, both of the positional information of the GPS and the positional information as acquired from the IMU based on calculation of relative position are acquired. Under a condition where the positional information of the GPS cannot be acquired, the positional information from the IMU is calculated as a relative position to the positional information of the GPS, and the present position of the vehicle is determined. Under a condition where the positional information is acquired from both of the GPS and the IMU, weighting is performed on the information, which corresponds to the situation where the positional information has been acquired, and an accurate position of the vehicle is determined.

For the purpose of carrying out the measurement of the position of the vehicle by combining the positional information from the GPS, the signals from the IMU and information from other sensors, a position, which can act as a measurement standard in various types of sensors in a measuring coordinate system, must be determined accurately.

Normally, carriers and other means, which are commercially marketed, are used when the GPS and the IMU are installed on board of a vehicle. As a result, the positions of installation of the GPS and the IMU are indefinite. In this respect, it is necessary to accurately measure positional relations (offset amount) between the measurement standard of the GPS and sensors installed at each site of the vehicle and between the measurement standard of the IMU and the sensors.

In the past, as a method to accurately determine the offset amount, a method to use a measuring device such as a total station has been known. The total station itself is a system with high cost. Also, a certain high level of skill and technique is required to perform the measurement by using the total station. Further, to use the measured values as the offset amount, the processing such as coordinate transformation is needed, and this means that it is necessary to use programs for calculation.

In this respect, if a measuring device such as a total station is not available, accurate measurement cannot be performed. Even when it may be available, complicated working procedures are required.

SUMMARY OF THE INVENTION

To solve the above problems, it is an object of the present invention to provide a simple method or a simple device, by which it is possible to perform the measurement on a measuring point where a mobile object is present and to measure a distance between the measuring points, or to measure the offset amount with respect to the coordinate system such as the GPS, the IMU, etc.

To attain the above object, the invention provides a measuring method for installing a measuring rod in a predetermined relation with respect to a coordinate system set to a mobile object, for transcribing a predetermined position of the measuring rod on a ground surface where the mobile object is set, for transcribing a measuring point of an object to be measured as set on the mobile object to the ground surface, for measuring a distance on the ground surface between the transcribed predetermined position and the transcribed measuring point, for obtaining a relation between the measuring point and the measuring rod on the ground based on a result of distance measurement, and for obtaining a position on a horizontal coordinate plane in the coordinate system of the measuring point based on the obtained relation and on the relation with the measuring rod with respect to the coordinate system. Also, the invention provides a measuring method for measuring a vertical distance between the predetermined position and the ground surface and a vertical distance between the measuring point and the ground surface, and for measuring three-dimensional position of the measuring point in the coordinate system.

Also, the present invention provides the measuring method as described above, comprising a step of installing a measuring rod in a predetermined relationship with respect to a coordinate system as set to a mobile object, a step of transcribing two predetermined positions of the measuring rod, each being projected in width direction from the mobile object, to points downward in vertical direction of a place of installation, a step of transcribing from the measuring point of the object to be measured as installed on the mobile object to the point downward in vertical direction of the place of installation, a step of measuring a vertical height of the predetermined position, a step of measuring a vertical height of the measuring point, a step of measuring a distance between transcribed points after the mobile object is moved, a step of obtaining a position of the measuring point with respect to the measuring rod on a plane where points are transcribed based on the distance between the transcribed points, a step of obtaining vertical height between the measuring point and the measuring rod based on the vertical height of the predetermined position and on the vertical height of the measuring point, wherein a three-dimensional position of a measuring point with respect to the coordinate system is determined based on the relation of the measuring rod to the coordinate system, based on the position of the measuring point with respect to the measuring rod on the plane, and based on the vertical height between the measuring point and the measuring rod.

Further, the present invention provides the measuring method as described above, wherein an IMU is installed on the mobile object, the coordinate system is an IMU coordinate system, and the measuring point is a center of an encoder mounted at an end of an axle shaft. Also, the present invention provides the measuring method as described above, wherein the measurement procedure as described above is repeatedly performed by changing a direction of the mobile object at an angle of 180°, and results of measurements obtained in two directions of the mobile object are averaged. Further, the present invention provides the measuring method as described above, wherein the transcribing downward in vertical direction is performed by using a plumb bob. Also, the present invention provides the measuring method as described above, wherein the transcribing downward in vertical direction is performed by a laser pointer for projecting a laser beam downward in vertical direction.

Further, the invention provides a measuring device as described above, comprising a measuring rod installed in a predetermined relation with respect to a coordinate system as set to a mobile object, and transcribing means for transcribing a predetermined position of the measuring rod on a ground surface.

Also, the invention provides a measuring device as described above, wherein the transcribing means is a plumb bob installed at a predetermined position on the measuring rod. Further, the invention provides a measuring device as described above, wherein the transcribing means is a laser pointer suspended at a predetermined position on the measuring rod. Also, the invention provides a measuring device as described above, wherein the transcribing means comprises a slider slidably mounted on the measuring rod, a ring rotatably provided on the slider, and a laser pointer mounted on the ring and for projecting a laser beam downward in vertical direction under a condition where no external force is applied on the ring. Further, the invention provides a measuring device as described above, wherein the measuring rod has a scale for measuring the predetermined position. Also, the invention provides a measuring device as described above, wherein the laser pointer has a function to measure a distance. Further, the invention provides a measuring device as described above, wherein the transcribing means has angular scale to measure a rotation angle of the ring. Also, the invention provides a measuring device as described above, wherein the transcribing means further has a plumb bob to be installed on a measuring point of an object to be measured.

The present invention provides a measuring method for installing a measuring rod in a predetermined relation with respect to a coordinate system set to a mobile object, for transcribing a predetermined position of the measuring rod on a ground surface where the mobile object is set, for transcribing a measuring point of an object to be measured as set on the mobile object to the ground surface, for measuring a distance on the ground surface between the transcribed predetermined position and the transcribed measuring point, for obtaining a relation between the measuring point and the measuring rod on the ground based on a result of distance measurement, and for obtaining a position on a horizontal coordinate plane in the coordinate system of the measuring point based on the obtained relation and on the relation with the measuring rod with respect to the coordinate system. Also, the present invention provides a measuring method for measuring a vertical distance between the predetermined position and the ground surface and a vertical distance between the measuring point and the ground surface, and for measuring three-dimensional position of the measuring point in the coordinate system. As a result, it is possible to measure the position of the measuring point with respect to the coordinate system as set on the mobile object by using a simple device and by a simple working procedure.

Also, the invention provides a measuring method, comprising a step of installing a measuring rod in a predetermined relationship with respect to a coordinate system as set to a mobile object, a step of transcribing two predetermined positions of the measuring rod, each being projected in width direction from the mobile object, to points downward in vertical direction of a place of installation, a step of transcribing from the measuring point of the object to be measured as installed on the mobile object to the point downward in vertical direction of the place of installation, a step of measuring a vertical height of the predetermined position, a step of measuring a vertical height of the measuring point, a step of measuring a distance between transcribed points after the mobile object is moved, a step of obtaining a position of the measuring point with respect to the measuring rod on a plane where points are transcribed based on the distance between the transcribed points, a step of obtaining vertical height between the measuring point and the measuring rod based on the vertical height of the predetermined position and on the vertical height of the measuring point, wherein a three-dimensional position of a measuring point with respect to the coordinate system is determined based on the relation of the measuring rod to the coordinate system, based on the position of the measuring point with respect to the measuring rod on the plane, and based on the vertical height between the measuring point and the measuring rod. As a result, it is possible to measure the position of the measuring point with respect to a coordinate system as set on the mobile object by using a simple device and through a simple working procedure.

Further, the invention provides a measuring method as described above, wherein an IMU is installed on the mobile object, the coordinate system is an IMU coordinate system, and the measuring point is a center of an encoder mounted at an end of an axle shaft. As a result, it is possible to measure the offset amount with respect to the coordinate system of the IMU by the encoder to detect a driving distance and the moving speed in simple manner.

Also, the present invention provides the measuring method as described above, wherein the measurement procedure as described in claim 1 or claim 3 is repeatedly performed by changing a direction of the mobile object at an angle of 180°, and results of measurements obtained in two directions of the mobile object are averaged. As a result, even when the place of installation is tilted, the tilting can be offset, and an accuracy of measurement is improved.

Further, the invention provides a measuring device, comprising a measuring rod installed in a predetermined relation with respect to a coordinate system as set to a mobile object, and transcribing means for transcribing a predetermined position of the measuring rod on a ground surface. As a result, it is possible to measure a position within a horizontal plane of the measuring point with respect to the coordinate system by using a simple device.

Also, the invention provides a measuring device as described above, wherein the transcribing means is a plumb bob installed at a predetermined position on the measuring rod. Or, the invention provides a measuring device as described above, wherein the transcribing means is a laser pointer suspended at a predetermined position on the measuring rod. As a result, it is possible to transcribe the measuring point in easy manner and by a simple arrangement.

Further, the invention provides a measuring device as described above, wherein the transcribing means comprises a slider slidably mounted on the measuring rod, a ring rotatably provided on the slider, and a laser pointer mounted on the ring and for projecting a laser beam downward in vertical direction under a condition where no external force is applied on the ring. As a result, it is possible to transcribe the measuring point in easy manner and by a simple arrangement.

Also, the invention provides a measuring device as described above, wherein the measuring rod has a scale for measuring the predetermined position. Further, the invention provides a measuring device as described above, wherein the transcribing means has angular scale to measure a rotation angle of the ring. As a result, it is possible to measure the transcribing position by the laser beam can be measured in easy manner.

Also, the invention provides a measuring device as described above, wherein the laser pointer has a function to measure a distance. As a result, it is possible to measure the distance to the measuring point accurately by simple procedure.

Further, the invention provides a measuring device as described above, wherein the transcribing means further has a plumb bob to be installed on a measuring point of an object to be measured. As a result, it is possible to transcribe the measuring point in easy manner by using simple implements.

BRIEF DESCRIPTION OF THE DRAWINGS

FIG. 4 represents schematical drawings when the present invention is applied on a mobile object.

FIG. 7 each represents a measuring device in a first embodiment of the present invention.

FIG. 10 represents schematical drawings, each showing a measuring device relating to a second embodiment of the present invention.

DETAILED DESCRIPTION OF THE PREFERRED EMBODIMENTS

Detailed description will be given below on embodiments of the present invention by referring to the attached drawings.

In the embodiments as described below, description will be given on a case where an IMU is installed on a ceiling of an automobile (vehicle) via a carrier, and an encoder is mounted on an axle shaft as a sensor to detect a moving distance and a moving speed.

When position and speed of the vehicle are estimated only by an integration of acceleration as outputted from the IMU, errors are extremely increased because errors are accumulated due to the causes such as noise.

To the contrary, as a method to detect the moving distance and the moving speed accurately, there is a method to detect the moving distance and the moving speed based on number of rotations of the tire. When the number of rotations of the tire is directly detected, there is no interference of noises. Since and the number of rotations in physical quantity are directly detected, analogical errors can be prevented and detection can be made with higher accuracy.

As a sensor to detect the number of rotations of the tire, an encoder is used. The encoder is mounted directly at an end of the axle shaft of the tire, and based on a signal from the encoder, a rotation angle and an angular velocity are detected. Also, based on the rotation angle, on the angular velocity and on diameter of the tire, the moving distance and the moving speed can be calculated.

Now, referring to FIG. 1, description will be given on an example of calculation of the translational distance and the revolving angle in two dimensions by using the encoder.

Figure 1:
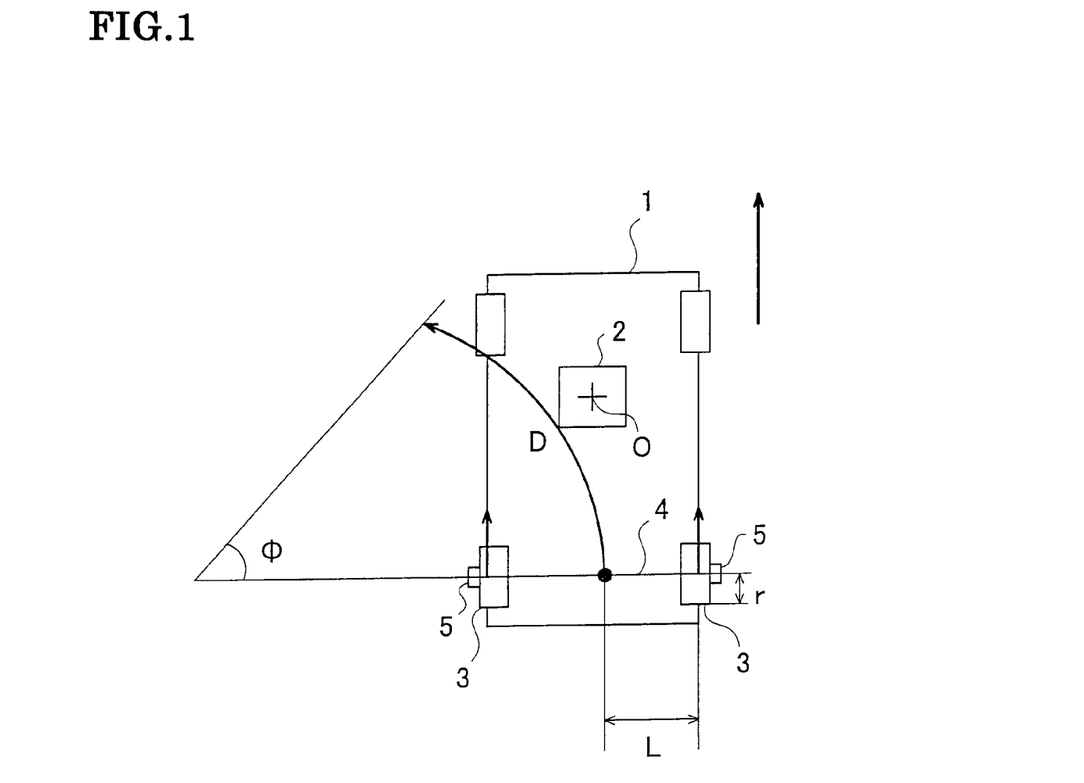
FIG. 1 is a schematical drawing to show an example of calculation of a translational distance and a revolving angle for a mobile object in two dimensions by using an encoder.
Figure 2:
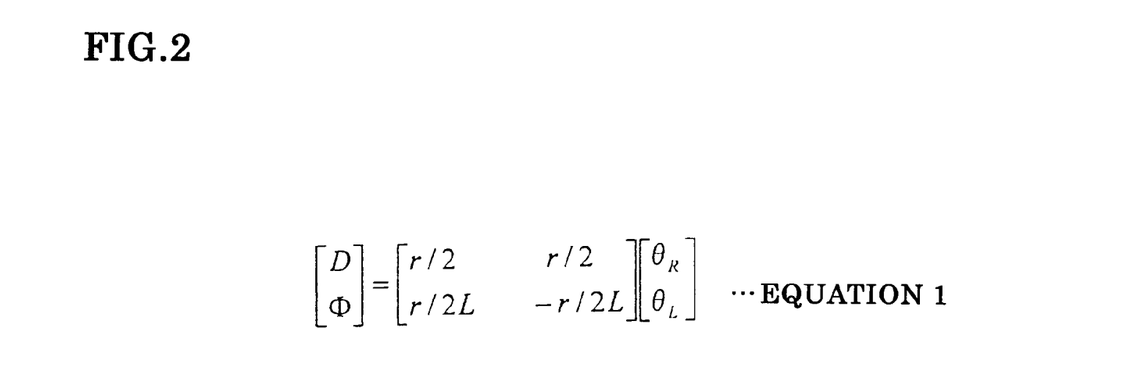
FIG. 2 represents an equation of a two-dimensional movement of the mobile object.

In FIG. 1, reference numeral 1 denotes a vehicle, numeral 2 denotes an IMU, numeral 3 denotes a tire, numeral 4 denotes an axle shaft, and numeral 5 denotes an encoder mounted on the axle shaft 4. If it is supposed in FIG. 1 that the symbol "O" represents an origin of the IMU coordinate system, the symbol "r" represents diameter of the tire, and a symbol "L" is diameter of the axle shaft, the translational distance D of the vehicle 1 and revolving angle Φ can be expressed by the equation 1 by using rotation angles $\theta_L$ and $\theta_R$ of a right tire and a left tire respectively.

Because two-dimensional movement of the mobile object can be given by the equation 1, if azimuth and coordinates at a measurement starting point are given, the position, the velocity and the attitude (direction of the mobile object) of the mobile object can be calculated.

By combining the values of position, velocity and attitude thus calculated with the values determined by the GPS, the position, the velocity and the attitude of the object can be estimated with high accuracy. This composite processing is performed in a coordinate system using the position of the origin of the IMU as an origin point. In this respect, it is necessary to calibrate a position where the encoder 5 is mounted and the positional relationship of the origin point of the IMU and to convert the result to a value at the position of the origin point of the IMU.

Next, referring to FIG. 3 to FIG. 6, description will be given on a method to determine an offset amount of the encoder with respect to the IMU coordinate system, which is needed for calibration of the IMU and the encoder. The offset amount of the encoder can be obtained by measuring the position in the IMU coordinate system. In the following, description will be given on a case where the encoder is regarded as an object to be measured and the measurement is performed by regarding the center of the encoder as the measuring point.

Figure 3:
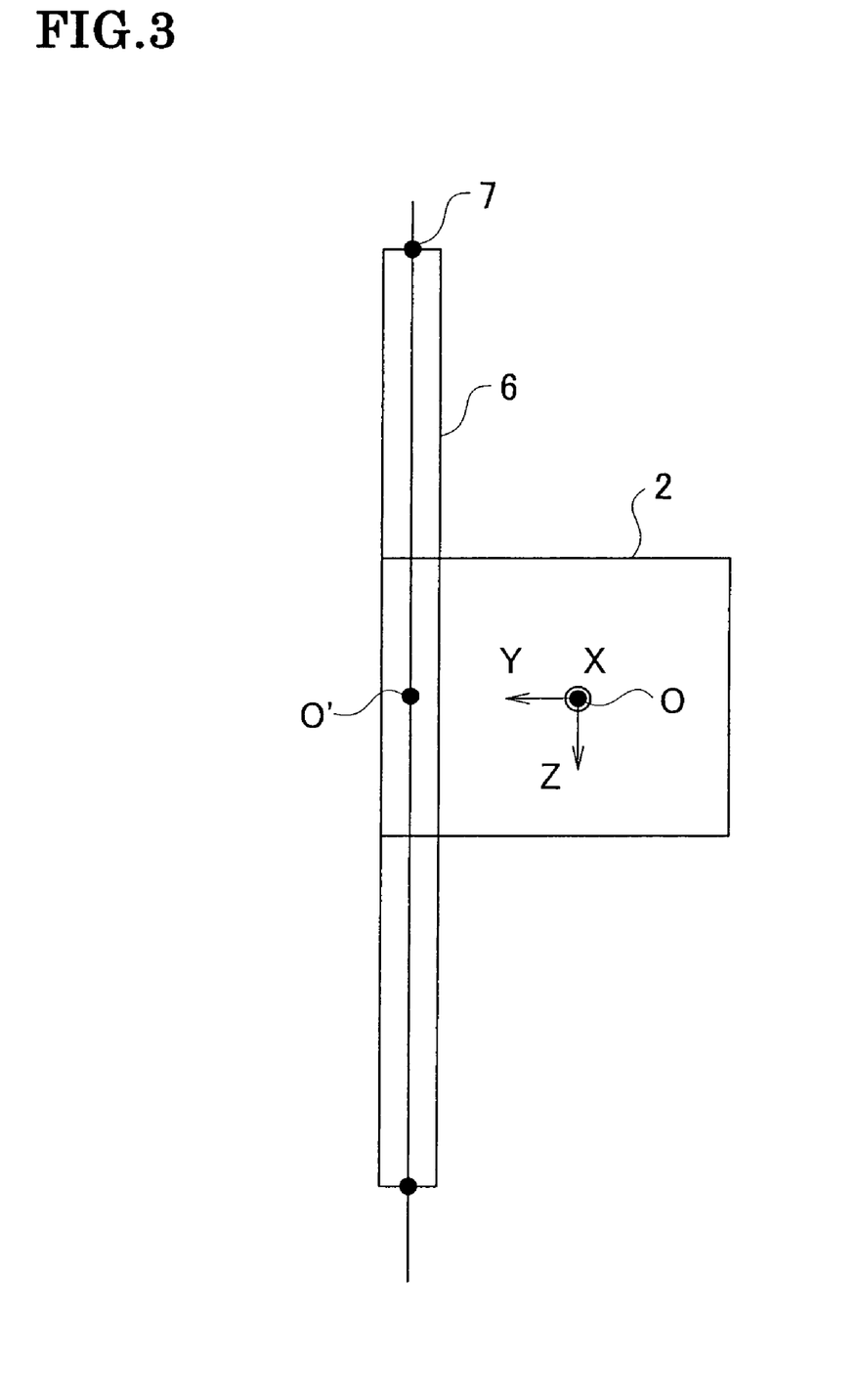
FIG. 3 is a schematical drawing to explain a relation between an IMU coordinate system and a measuring rod when the present invention is carried out.
Figure 4A:
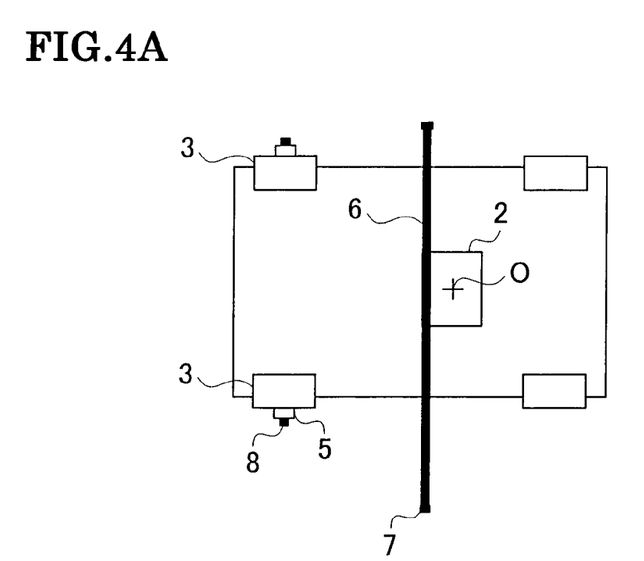
FIG. 4(A) is a plan view.
Figure 4B:
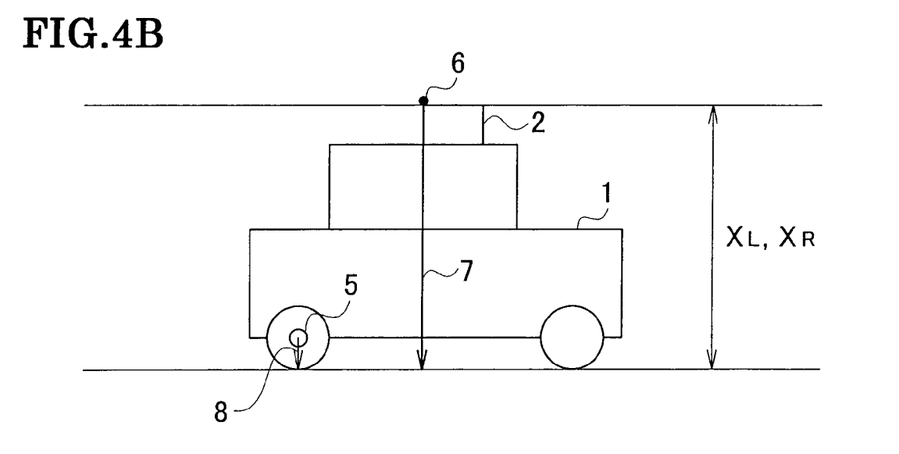
FIG. 4(B) is a side view.

A measuring rod 6 with a known length is mounted on the ceiling of the vehicle 1. Preferably, the measuring rod 6 is integrated with the IMU 2, and the measuring rod 6 is set in parallel to Z-axis of the IMU coordinate system (an coordinate axis, which runs in horizontal direction and in parallel to the axle shaft 4). That is, the measuring rod 6 is equivalent as Z-axis of the IMU coordinate system, which is moved in parallel. Further, the offset amount between the center O' of the measuring rod 6 and the origin point O is determined with respect to X-axis, Y-axis and Z-axis respectively.

The vehicle 1 is parked at a predetermined place. The place of parking is preferably a place, which is horizontal or approximately horizontal.

Transcribing means are provided on both ends of the measuring rod 6, and positions of the two ends, i.e. the measuring points already known, are transcribed on the ground in vertical direction by the transcribing means.

For instance, the plumb bob (i.e. a bob weight) is used as the transcribing means. Each of plumb bobs 7 is suspended from each of the two ends of the measuring rod 6 respectively. After waiting for the time when the plumb bobs 7 stand still, a vertical height of the two ends of the plumb bobs 6 from the ground surface are measured. These measured values are set as XL and XR respectively. The measuring rod 6 is mounted in horizontal position or in approximately horizontal position. Preferably, it is mounted in horizontal position by means of a leveling instrument.

Figure 5:
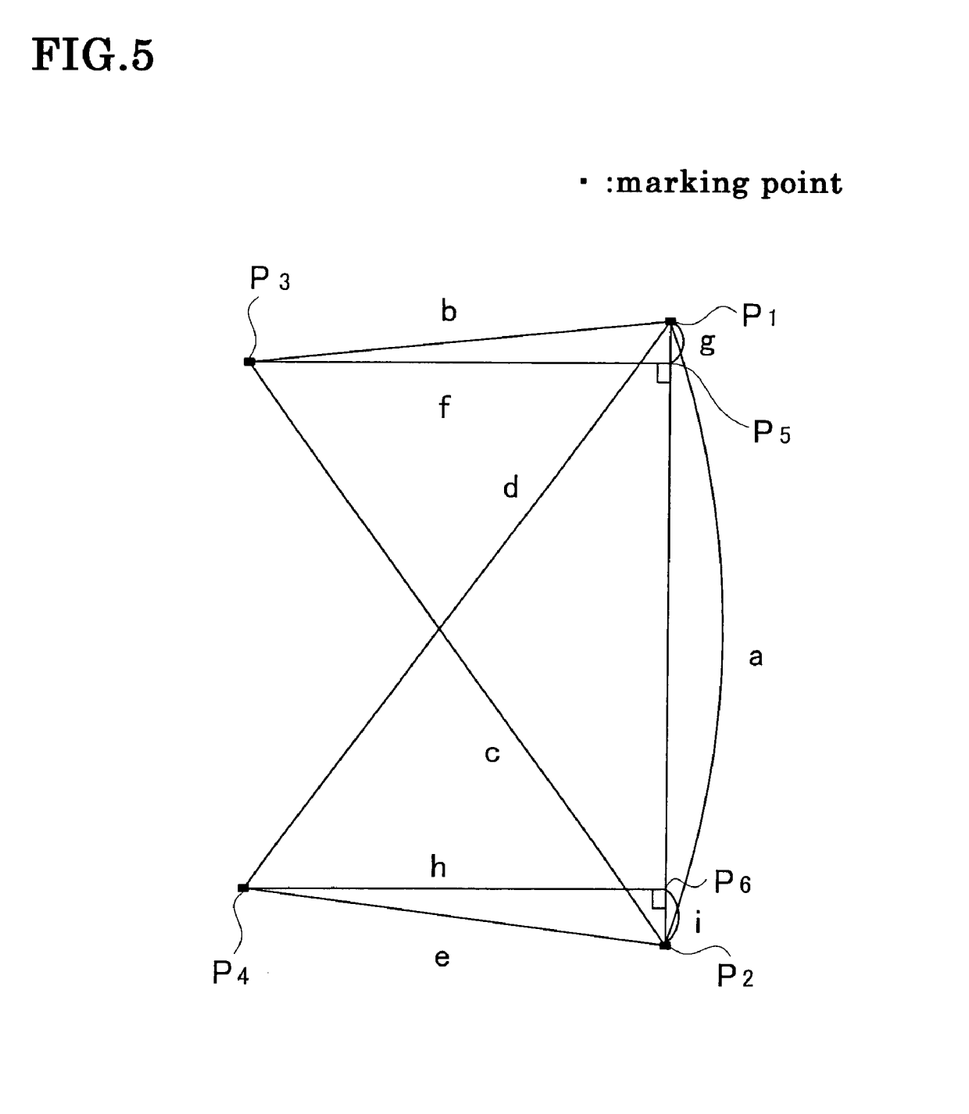
FIG. 5 is a schematical drawing to explain a relation of markings when the present invention is applied.
Figure 6:
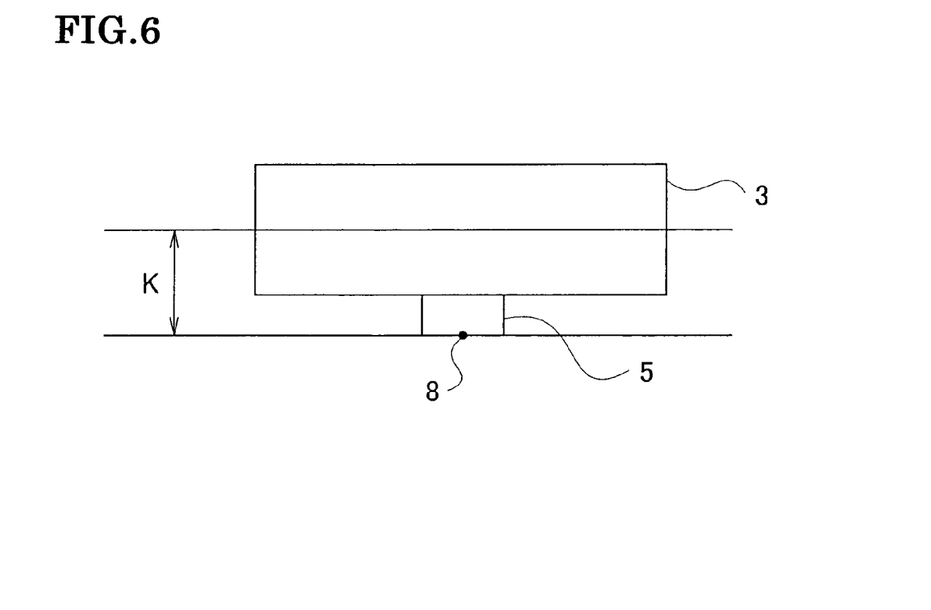
FIG. 6 is a schematical drawing to explain an offset relation between a measuring point and a width center of a tire in case an object to be measured is an encoder.

Contact points (P1 and P2) of the plumb bob 7 and the ground surface are transcribed on the ground surface by marking (See FIG. 5).

Plumb bobs 8 are suspended from centers (measuring points) on side surfaces of the encoders 5 and 5, which are already mounted on the left and the right rear wheel tires 3 and 3. In similar manner, marking (transcribing) is performed on the ground at contact points (P3 and P4) between the plumb bobs 8 and the ground surface (see FIG. 5). An offset amount K from a width center of the tire 3 to the surface of the encoder 5 is determined in advance (see FIG. 6).

The vehicle 1 is moved, and distances (b, c, d and e) between four points (P1 to P4) with markings as shown in FIG. 5 are measured. Area of each of triangles (P1, P3 and P2) and (P1, P4 and P2) thus defined is determined. Further, the values of heights "f" and "h" with respect to a base "a" (axis of Z-coordinate) are determined by calculation. Similarly, a distance each between the points P5 and P6 and P1 and P2 where the heights "f" and "h" cross the base "a" (i.e. the values of "g" and "i") are determined by calculation.

Specifically, if a triangle is obtained, which has its base connecting the contact point P1 to the contact point P2 and a measuring point (e.g. a contact point P3) as a vertex, the position of the measuring point can be determined.

Thereby an offset amount on the encoder 5 with respect to the origin point O of the IMU coordinate system can be obtained.

When the vehicle 1 is parked at a horizontal place, the measurement of the offset amount can be completed by a single operation.

In case the parking place is tilted, direction of the vehicle 1 is changed by 180°, and the offset amount is determined again by the procedure as described above.

An average value is taken from the offset amount (which has been determined by changing the direction of the vehicle 1 by 180°) and the offset amount as described above. As a result, an error caused by tilting is offset, and an accurate offset amount can be obtained.

In the description as given above, the offset amount to the origin point of the IMU coordinate system is obtained, while the offset amount in a coordinate system, which has the predetermined position of the vehicle 1 (e.g. a mechanical center of the vehicle 1 as the origin point), can be obtained in similar manner.

By the measuring method according to the present embodiment, full-scale measurement with high accuracy can be performed in simple manner and at low cost without using a total station.

By the measuring method according to the present embodiment, measurement with high accuracy can be carried out by using simple and easily available components and devices such as the measuring rod 6, the plumb bobs 7 and 8, a measure, a pocket calculator, etc., and it is economical.

Next, description will be given on a measuring device and a measuring point transcribing device, which are preferably used for carrying out the measuring method of the present embodiment.

Figure 7A:
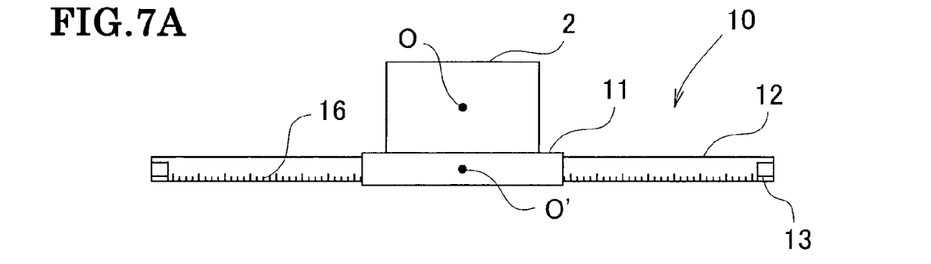
FIG. 7(A) is a plan view.
Figure 7B:
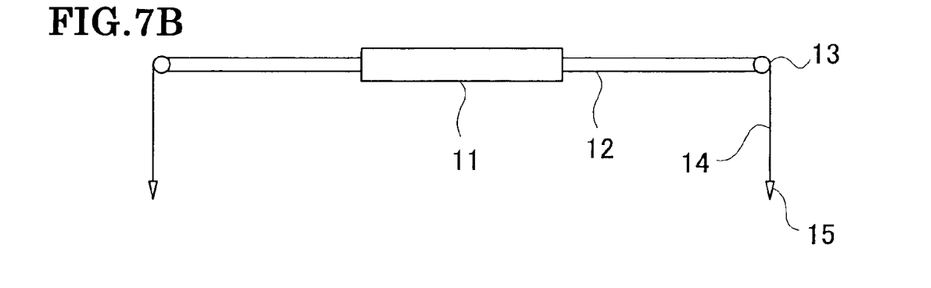
FIG. 7(B) is a front view.

FIG. 7 shows a measuring device 10 of the first embodiment according to the present invention.

The measuring rod 6 has a rod holder 11 and a scale rod 12, which is extensible and reducible in form of an insert with respect to the rod holder 11. The rod holder 11 is fixed on the IMU 2 or a carrier (not shown) of the vehicle. The rod holder 11 runs in parallel to one coordinate axis of the IMU 2 or the like, and the center O' of the rod holder 11 is kept in a known relation with the origin point O of the coordinate system such as the IMU 2.

A scale 16 is marked on the scale rod 12, and the scale rod 12 can be fixed at any arbitrary position by means of a pushing screw (not shown). Therefore, by reading the scale 16 on the scale rod 12, an amount of protrusion of the scale rod 12 from the rod holder 11, i.e. a distance from the center O' to the forward end, can be determined.

At a tip of the scale rod 12, a reel 13 with scale is installed as transcribing means. From the reel 13 with scale, a wire 14 is suspended, and a weight (plumb) 15 is provided at a lower end of the wire 14.

The wire 14 is biased in winding direction. A winding force is lower than the self-weight of the weight 15. On the wire 14 thus pulled out, a predetermined tensile force is applied by the winding force, and the wire 14 is pulled out by the self-weight of the weight (plumb) 15.

By the pulling-out of the wire 14, a reel (not shown) is rotated. By a scale (not shown) to convert a rotation amount of the reel to a pull-out length of the wire, it is possible to determine the pull-out length of the wire, i.e. a vertical distance from the tip of the scale rod 12 to the lower end of the weight 15.

Therefore, when a scale 16 of the scale rod 12 and the scale (not shown) of the reel 13 with scale are read under the condition that the scale rod 12 is pulled out so that its tip is brought to a position as required, and further, when the weight 15 is set on the ground surface, positions of (P1 and P2) can be measured.

As a result, by using the measuring device 10, the positions of (P1 and P2) can be measured promptly without transcribing (P1 and P2) on the ground surface.

Figure 8:
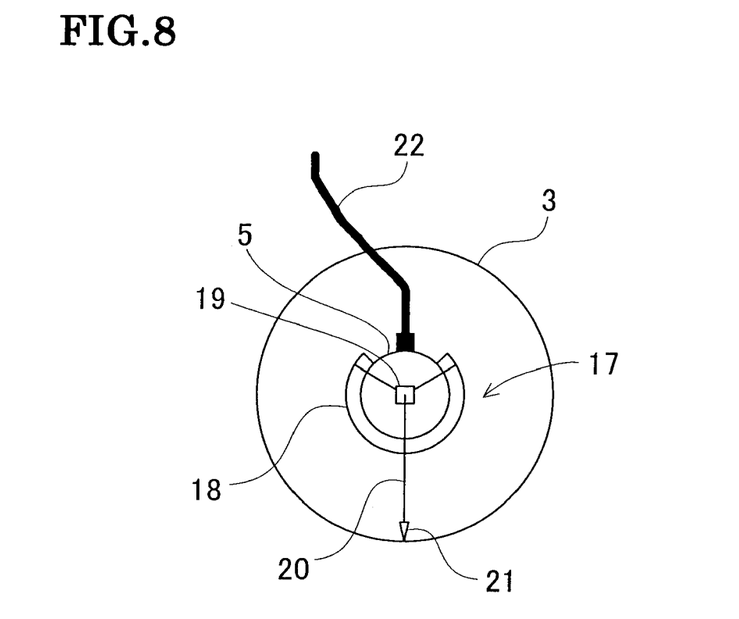
FIG. 8 is a front view in case a plumb bob is mounted on an encoder via an attachment in the first embodiment of the present invention.
Figure 9:
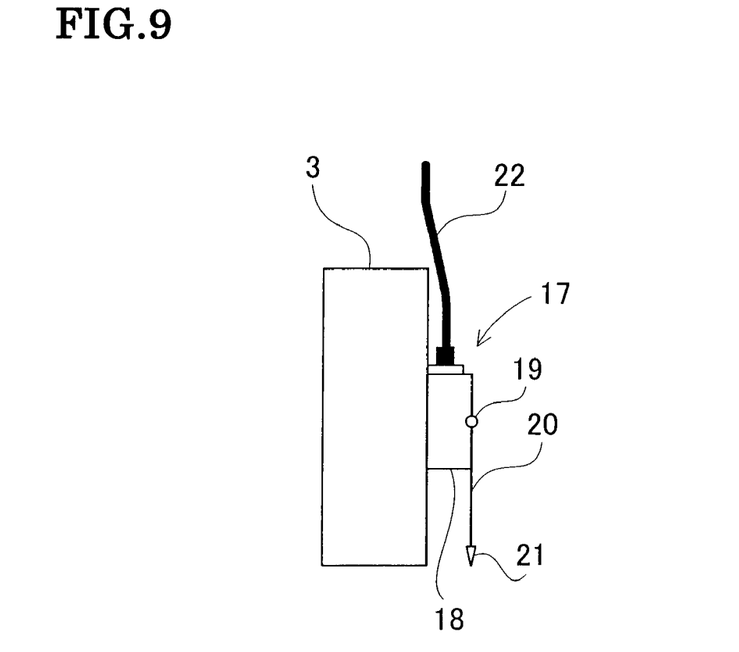
FIG. 9 is a side view when the plumb bob is mounted.

FIG. 8 and FIG. 9 each represents an example of the measuring device 17 to determine the position of the encoder 5.

The measuring device 17 comprises an attachment 18 engageable with and removable from the encoder 5 and also comprises a reel 19 with scale, which is held along a centerline of the encoder 5 at a central position of the attachment 18.

From the reel 19 with scale, a wire 20 is suspended, and a weight 21 is mounted at a lower end of the wire 20.

On the reel 19 with scale, similarly to the case of the reel 13 with scale, the wire 20 is biased in the winding direction. The winding force is lower than the self-weight of the weight 21, and the wire 20 is pulled out by the self-weight of the weight 21.

The wire 20 is suspended from the central position of the encoder 5, and an amount of pull-out of the wire 20 can be read from a scale (not shown), which indicates the pull-out amount by converting from the rotation amount of the reel.

Accordingly, when the attachment 18 is engaged with the encoder 5 and the wire 20 is suspended by the weight of the plumb (weight) 21, and when the plumb 21 is brought into contact with the ground surface, the points (P3 and P4) (see FIG. 5) can be marked on the ground surface.

In FIG. 8 and FIG. 9, reference numeral 22 represents a cable, which is used to supply electric power to the encoder 5 and to transmit a signal from the encoder 5.

Figure 10A:
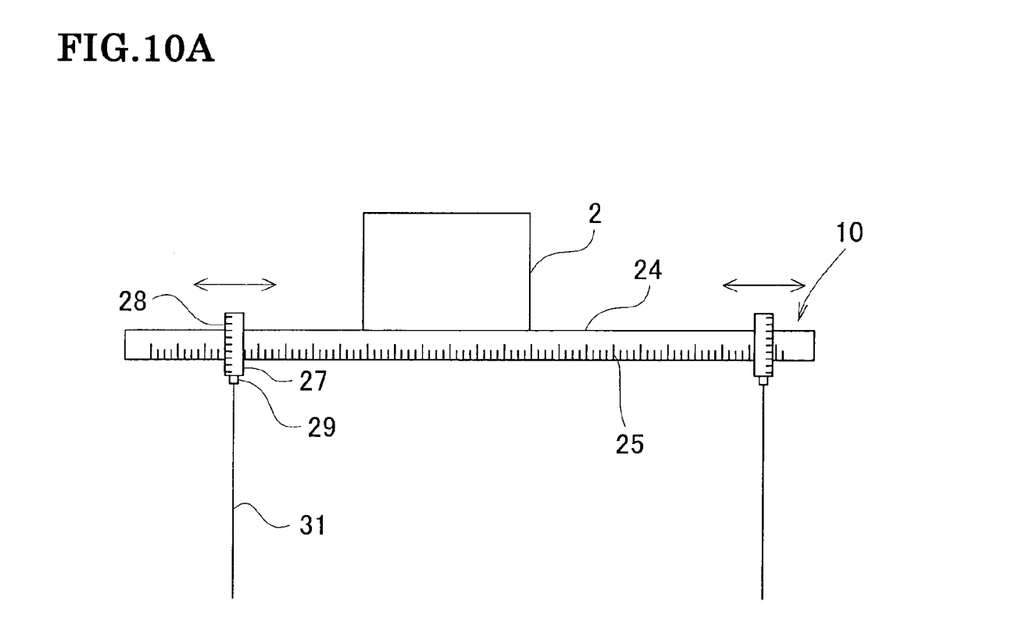
FIG. 10(A) is a front view.
Figure 10B:
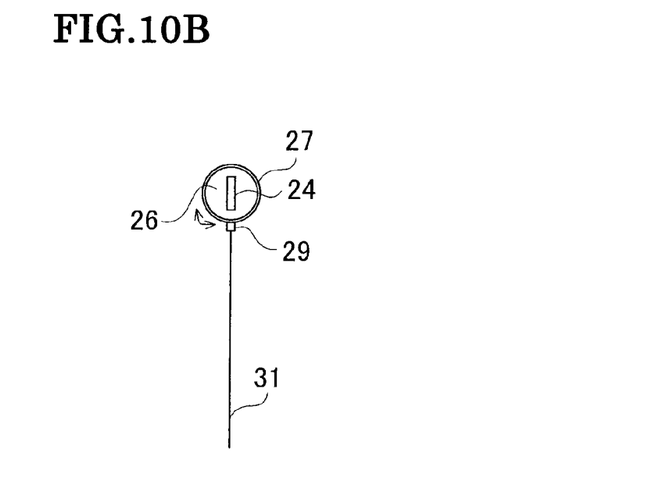
FIG. 10(B) is a side view.

FIG. 10 shows a second embodiment of the invention of the measuring device 10.

A scale rod 24 is mounted on the IMU 2 or on a carrier. The centerline of the scale rod 24 runs in parallel to the coordinate axis of the coordinate system of the IMU 2, and the central position of the scale rod 24 is set to a known position with respect to the coordinate system of the IMU 2.

A slider 26 is slidably engaged with the scale rod 24. The slider 26 is designed in circular shape. A ring 27 is engaged on the slider 26, and the ring 27 can be rotated without resistance along the centerline of the scale rod 24 as a center. By using a fixing implement such as a pushing screw (not shown), the ring 27 can be fixed at any rotating position as desired.

A laser pointer 29 is provided on the ring 27, and a laser beam 31 is projected in radial direction and runs through the center of the ring 27. The laser pointer 29 also plays a role as a weight. Under the condition where no external force is applied on the ring 27, the laser pointer 29 is brought to its lowest position due to the self-weight of the laser pointer 29, and the laser beam 31 is projected downward in vertical direction.

On the scale rod 24, a scale 25 is marked in a direction of its length. By using the scale 25, a position of the slider 26, i.e. a projecting position of the laser pointer 29, can be set at a known measuring point. On the ring 27, angular scale 28 is marked along a circumferential direction. By the angular scale 28, rotation angle of the ring 27 with respect to the scale rod 24 can be determined.

In the second embodiment, the slider 26, the ring 27, the laser pointer 29, etc. make up together the transcribing means. The laser pointer 29 may be simply suspended on the slider 26.

An attachment 18 (see FIG. 8) is mounted on the encoder 5. The attachment has a protuberance (not shown) to indicate the central position of the encoder 5, i.e. a measuring point. The protuberance is designed in such size and shape so as to interrupt a part of the laser beam 31.

Figure 11A:
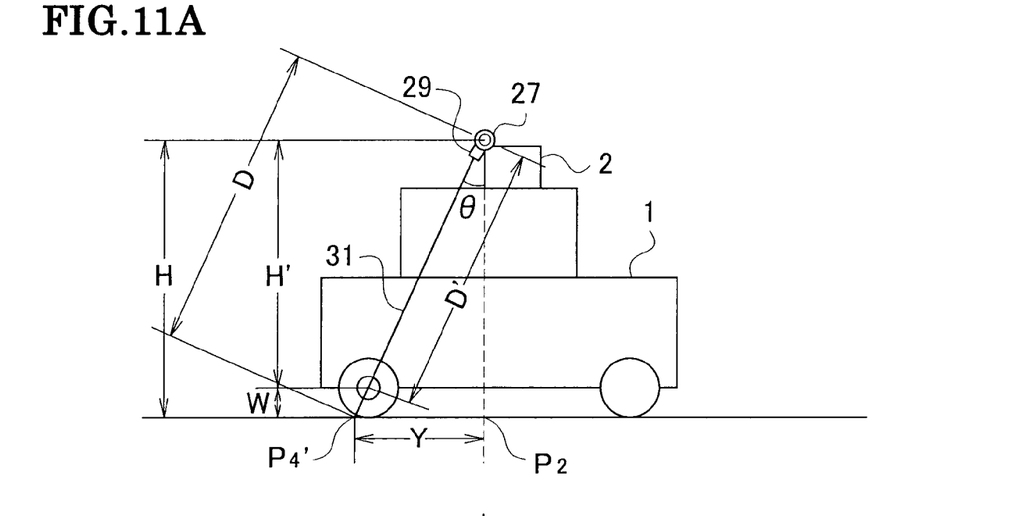
FIG. 11(A), FIG. 11(B) and FIG. 11(C) each represents a schematical drawing to explain operation in the second embodiment.
Figure 11B:
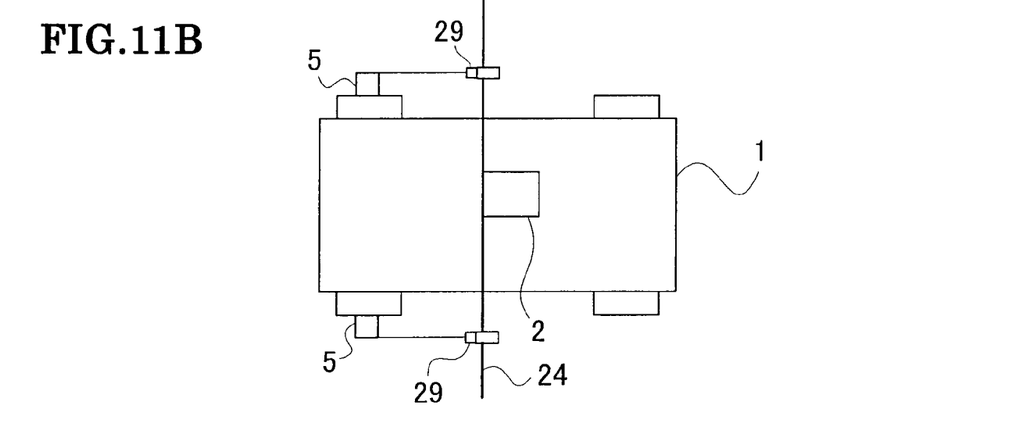
Figure 11C:
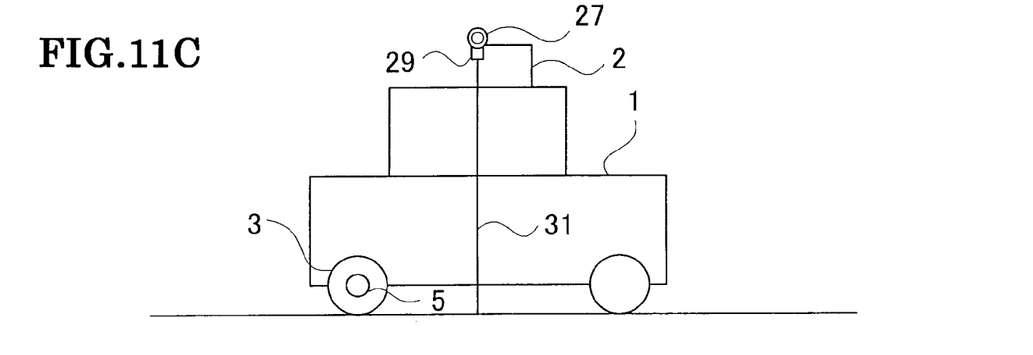

Referring to FIG. 5 and FIG. 11, description will be given below on operation of the second embodiment.

The vehicle 1 is parked at horizontal or at approximately horizontal place.

The slider 26 is moved along the scale rod 24, the ring 27 is rotated, and the laser beam 31 is projected. A position in Z-axis direction (see FIG. 3) and a rotation angle of the laser pointer 29 are set so that the laser beam 31 is projected to the protuberance of the attachment. A position in Z-axis direction (see FIG. 3) is measured by the scale 25, and the rotation angle of the laser pointer 29, i.e. a projecting angle θ of the laser beam 31, is measured by the angular scale 28.

Next, under the condition where the laser beam 31 is projected to the protuberance of the attachment, a point where the laser beam passing through the protuberance is projected to the ground surface, i.e. a point where the laser beam transcribes the measuring point, is indicated by marking (P4').

When the marking is completed, the ring 27 is made in free condition without changing the horizontal position of the laser pointer 29 in horizontal direction, and the laser pointer 29 is set to vertical position. Under this condition, a point where the laser beam 31 is projected to the ground surface is indicated by marking (P2).

On the opposite side, the same marking procedure is performed, and the points (P1) and (P3') are obtained.

The points (P1) and (P2) obtained in this marking procedure correspond to P5 and P6 in FIG. 5 respectively. After the marking operation, the vehicle 1 is moved, and a distance "Y" between P2 and P4', a distance "b" between P1 and P3', and a distance "a" between P1 and P2 are measured by the scale.

In this embodiment, P1 is the same as P5, and P2 is the same as P6. Thus, the distance "a" between P1 and P2 is equal to a distance between P5 and P6, and a distance "b" between P1 and P3' is equal to a distance "f", and a distance "e" between P2 and P4 is equal to a distance "h".

Also, from the distance "Y" between P2 and P4' and from the projecting angle θ, a vertical distance "H" from the ground surface to the center of the ring 27 can be obtained as "Y tan(90°−θ)". Further, a distance "D" from the marking P4' to the center of the ring 27, i.e. a distance "D" between the marking P4' and the center of the scale rod 24, can be obtained as: "Y×(sin θ)$^{-1}$".

Here, it is supposed that the distance "W" from the ground surface to the center of the encoder 5 is obtained by actual measurement or from the standards of the tire.

Therefore, a vertical distance H' from the center of the ring 27 to the center of the encoder 5 is given as:

$$H'=(H-W).$$

Because the laser beam 31 has a projection angle of θ, the distance "Y" contains an error corresponding to "W tan θ". Then, a horizontal distance Y' from the center of the ring 27 to the center of the encoder 5 in forward and backward directions of the vehicle is given by:

$$Y'=(Y-W\tan\theta)$$

Further, a distance D' from the center of the ring 27 to the center of the encoder 5 is given as:

$$D'=Y\times(\sin\theta)^{-1}-W\times(\cos\theta)^{-1}$$

Also, a position in Z-axis direction can be promptly determined by reading the scale 25 of the scale rod 24.

As described in the first embodiment, by changing the direction of the vehicle 1 at an angle of 180° and by performing the measurement again, the errors can be offset, and the accuracy of the measurement can be increased.

Figure 12:
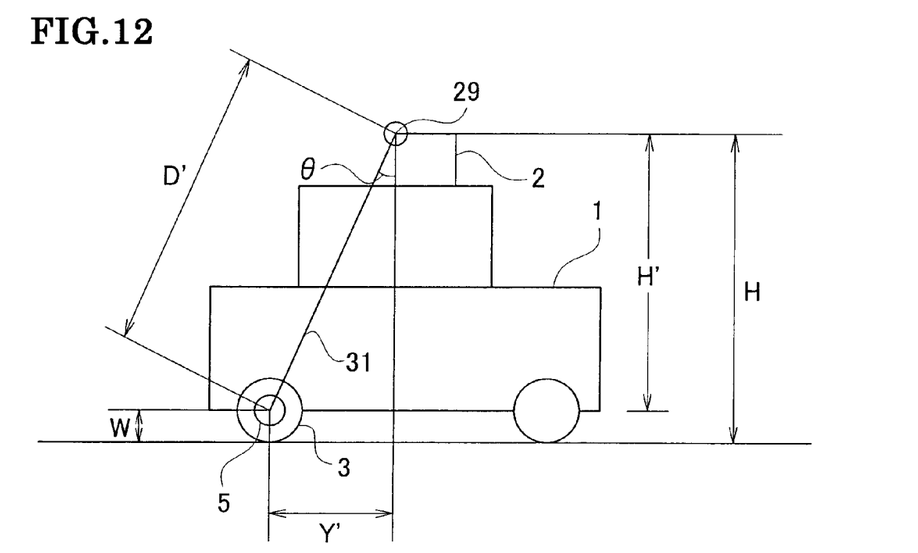
FIG. 12 is a schematical drawing to show a measuring device in a third embodiment of the present invention.

Next, FIG. 12 shows a third embodiment of the invention. In the measuring device used in the third embodiment, the laser pointer 29 as described in the second embodiment has a function of distance measurement. In FIG. 12, the same component as shown in FIG. 11 is referred by the same symbol, and detailed description is not given here.

The vehicle 1 is parked at horizontal or at approximately horizontal place.

The slider 26 is moved along the scale rod 24, the ring 27 is rotated, and the laser beam 31 is projected, the position in Z-axis direction (see FIG. 3) the rotation angle of the laser pointer 29 are set so that the laser beam 31 is projected to the protuberance of the attachment. The position in Z-axis direction (see FIG. 3) is measured by the scale 25, and the rotation angle of the laser pointer 29, i.e. a projecting angle θ of the laser beam 31, is measured by the angular scale 28. Further, a distance D' between the centerline of the scale rod 24 and the protuberance of the attachment is measured by the laser pointer 29.

Further, from the distance D' and the projecting angle θ, a vertical distance H' is given as:

$$H'=D'\cos\theta$$

and a horizontal distance Y' is given as:

$$Y'=D'\sin\theta$$

Next, in case the laser pointer 29 has a function of distance measurement, the angular scale 28 may not be used.

It is supposed here that a distance "W" from the ground surface to the center of the encoder 5 is obtained by actual measurement or from the standards of the tire.

The position in Z-axis direction (see FIG. 3) and the rotation angle of the laser pointer 29 are set so that the laser beam 31 is projected to the protuberance of the attachment, and a distance D' between the centerline of the scale rod 24 and the protuberance of the attachment is measured. The laser pointer 29 is set in free condition, and a laser beam 31 is projected downward in vertical direction from the laser pointer 29, and a distance between the ground surface and the centerline of the scale rod 24 is determined.

The vertical distance H' is given as: H'=H−W, and the horizontal distance Y' is given as: $Y'=\sqrt{(D^2-H'^2)}$.

In the third embodiment as described above, the offset amount of the sensor in a predetermined coordinate system can be measured without putting the marking on the ground surface, and as a result, the working efficiency is extensively improved.

Figure 13:
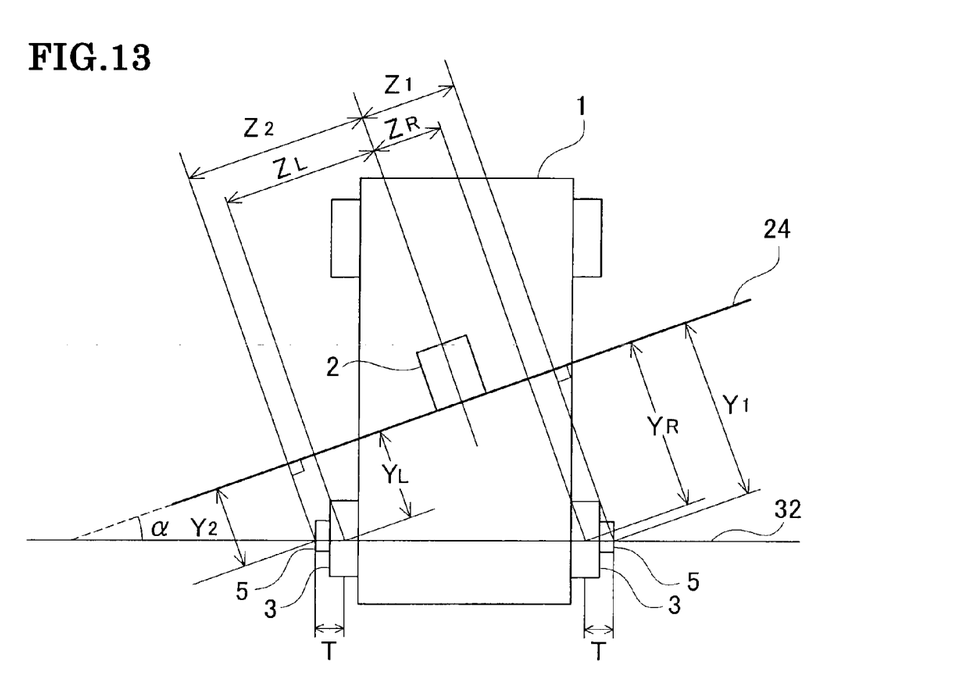
FIG. 13 is a drawing to explain a method of amendment when a scale rod is tilted with respect to the mobile object in case where a measuring device according to the present invention is installed.

FIG. 13 shows a case where the axle shaft 32 does not run in parallel to the centerline of the scale rod 24. If it is supposed that it is tilted at an inclination α, the inclination of the scale rod 24 is given as:

$$\alpha=\tan^{-1}[(Y1-Y2)/(Z1+Z2)]$$

Further, if it is supposed that the offset amount between the measuring point of the encoder 5 and width center of the tire 3 is T, calculation can be made as follows:

$$YL=Y2+T\sin\alpha$$

$$YR=Y1+T\sin\alpha$$

$$ZL=Z2-T\cos\alpha$$

$$ZR=Z1-T\cos\alpha$$

The values of "T sin α" and "T cos α" appear as errors when calculation is made by assuming that there is no tilting. Therefore, in case the values of "T sin α" and "T cos α" exceed the prescribed values, the measured values are corrected by the equations as given above.

The present invention can be applied not only in a case where it is wanted to determine the offset amount of a sensor with respect to the coordinate axis as set by a mobile object, but also in a case where standard position of an operation implement such as bucket, blade, etc. from a machine center of a construction machine (when the mobile object is a construction machine) is to be determined.

The invention claimed is:

1. A measuring method comprising steps of:
   installing a measuring rod in a predetermined relation with respect to a coordinate system set to a mobile object,
   transcribing a predetermined position of said measuring rod on a ground surface where said mobile object is set,
   transcribing a measuring point of an object to be measured as set on said mobile object to the ground surface,
   measuring a distance on the ground surface between said transcribed predetermined position and said transcribed measuring point,
   obtaining a relation between said measuring point and said measuring rod on the ground based on a result of distance measurement,
   obtaining a position on a horizontal coordinate plane in said coordinate system of said measuring point based on the obtained relation and on the relation with the measuring rod with respect to said coordinate system,
   measuring a vertical distance between said predetermined position and the ground surface and a vertical distance between said measuring point and the ground surface, and
   measuring three-dimensional position of said measuring point in said coordinate system.

2. A measuring method, comprising steps of:
   installing a measuring rod in a predetermined relationship with respect to a coordinate system as set to a mobile object,
   transcribing two predetermined positions of said measuring rod, each being projected in width direction from said mobile object, to points downward in vertical direction of a place of installation,
   transcribing from the measuring point of the object to be measured as installed on said mobile object to the point downward in vertical direction of said place of installation,
   measuring a vertical height of said predetermined position,
   measuring a vertical height of said measuring point,
   measuring a distance between transcribed points after said mobile object is moved,
   obtaining a position of said measuring point with respect to said measuring rod on a plane where points are transcribed based on said distance between said transcribed points,
   obtaining vertical height between said measuring point and said measuring rod based on said vertical height of the predetermined position and on said vertical height of said measuring point, wherein a three-dimensional position of a measuring point with respect to said coordinate system is determined based on the relation of said measuring rod to said coordinate system, based on the position of said measuring point with respect to said measuring rod on the plane, and based on the vertical height between said measuring point and said measuring rod.

3. A measuring method according to claim 1 or 2, wherein an IMU is installed on said mobile object, said coordinate system is an IMU coordinate system, and said measuring point is a center of an encoder mounted at an end of an axle shaft.

4. A measuring method according to claim 1 or 2, wherein the measurement method is repeatedly performed by changing a direction of said mobile object at an angle of 180°, and results of measurements obtained in two directions of said mobile object are averaged.

5. A measuring method according to claim 1 or 2, wherein the transcribing downward in vertical direction is performed by using a plumb bob.

6. A measuring method according to claim 1 or 2, wherein the transcribing downward in vertical direction is performed by a laser pointer for projecting a laser beam downward in vertical direction.

7. A measuring device, comprising a measuring rod installed in a predetermined relation with respect to a coordinate system as set to a mobile object, and transcribing means for transcribing a predetermined position of said measuring rod on a ground surface, wherein said transcribing means comprises a slider slidably mounted on said measuring rod, a ring rotatably provided on said slider, and a laser pointer mounted on said ring and for projecting a laser beam downward in vertical direction under a condition where no external force is applied on said ring.

8. A measuring device according to claim 7, wherein said measuring rod has a scale for measuring said predetermined position.

9. A measuring device according to claim 7, wherein said laser pointer has a function to measure a distance.

10. A measuring device according to claim 7, wherein said transcribing means has angular scale to measure a rotation angle of said ring.

11. A measuring device according to claim 7, wherein said transcribing means further has a plumb bob to be installed on a measuring point of an object to be measured.

* * * * *